United States Patent
Gonzalez et al.

(10) Patent No.: US 7,782,325 B2
(45) Date of Patent: Aug. 24, 2010

(54) MOTHERBOARD FOR SUPPORTING MULTIPLE GRAPHICS CARDS

(75) Inventors: Nelson Gonzalez, Miami, FL (US); Humberto Organvidez, Miami, FL (US)

(73) Assignee: Alienware Labs Corporation, Miami, FL (US)

( * ) Notice: Subject to any disclaimer, the term of this patent is extended or adjusted under 35 U.S.C. 154(b) by 0 days.

(21) Appl. No.: 10/689,716

(22) Filed: Oct. 22, 2003

(65) Prior Publication Data

US 2005/0088445 A1   Apr. 28, 2005

(51) Int. Cl.
G06F 15/80  (2006.01)
G06F 13/14  (2006.01)
G06F 3/00   (2006.01)

(52) U.S. Cl. .................... 345/505; 345/520; 710/21
(58) Field of Classification Search ............... 345/501, 345/502, 520, 503, 505; 710/1, 2, 7, 8, 20, 710/21
See application file for complete search history.

(56) References Cited

U.S. PATENT DOCUMENTS

| | | | |
|---|---|---|---|
| 5,473,750 A | 12/1995 | Hattori | |
| 5,485,559 A | 1/1996 | Sakaibara | |
| 5,546,530 A * | 8/1996 | Grimaud et al. | 345/505 |
| 5,560,034 A | 9/1996 | Goldstein | |
| 5,638,531 A | 6/1997 | Crump et al. | |
| 5,774,133 A | 6/1998 | Neave et al. | |
| 5,784,075 A | 7/1998 | Krech, Jr. | |
| 5,790,842 A | 8/1998 | Charles et al. | |
| 5,799,204 A | 8/1998 | Pesto, Jr. | |
| 5,818,469 A | 10/1998 | Lawless et al. | |
| 5,841,444 A | 11/1998 | Mun et al. | |
| 5,892,964 A | 4/1999 | Horan et al. | |
| 5,914,727 A | 6/1999 | Horan et al. | |
| 5,923,339 A | 7/1999 | Date et al. | |
| 5,937,173 A | 8/1999 | Olarig et al. | |

(Continued)

FOREIGN PATENT DOCUMENTS

EP    1 061 434 A2    12/2000

(Continued)

OTHER PUBLICATIONS

Gary Brown, "How Motherboards Work", http://electronics.howstuffworks.com/motherboard.htm/printable.*

(Continued)

*Primary Examiner*—Joni Hsu
(74) *Attorney, Agent, or Firm*—Hogan Lovells US LLP

(57) ABSTRACT

The invention provides a motherboard that uses a high-speed, scalable system bus such as PCI Express® to support two or more high bandwidth graphics slots. The lanes from the motherboard chipset may be directly routed to two or more graphics slots. For instance, the chipset may route (1) thirty-two lanes into two x16 graphics slots; (2) twenty-four lanes into one x16 graphics slot and one x8 graphics slot (the x8 slot using the same physical connector as a x16 graphics slot but with only eight active lanes); or (3) sixteen lanes into two x8 graphics slots (again, physically similar to a x16 graphics slot but with only eight active lanes). Alternatively, a switch can convert sixteen lanes coming from the chipset root complex into two x16 links that connect to two x16 graphics slots. The system according to the invention is agnostic to a specific chipset.

24 Claims, 11 Drawing Sheets

U.S. PATENT DOCUMENTS

| | | | |
|---|---|---|---|
| 5,986,697 A | 11/1999 | Cahill, III | |
| 6,006,289 A | 12/1999 | James et al. | |
| 6,008,821 A | 12/1999 | Bright et al. | |
| 6,088,043 A | 7/2000 | Kelleher et al. | |
| 6,108,739 A | 8/2000 | James et al. | |
| 6,141,021 A | 10/2000 | Bickford et al. | |
| 6,157,393 A | 12/2000 | Potter et al. | |
| 6,205,119 B1 | 3/2001 | Kaczynski | |
| 6,226,700 B1 | 5/2001 | Wandler et al. | 710/101 |
| 6,275,240 B1 | 8/2001 | Riffault | |
| 6,295,566 B1* | 9/2001 | Stufflebeam | 710/302 |
| 6,304,244 B1 | 10/2001 | Hawkins et al. | |
| 6,323,875 B1 | 11/2001 | Millman et al. | |
| 6,329,996 B1 | 12/2001 | Bowen et al. | |
| 6,384,833 B1 | 5/2002 | Denneau et al. | |
| 6,389,487 B1 | 5/2002 | Grooters | |
| 6,429,903 B1 | 8/2002 | Young | 348/552 |
| 6,473,086 B1 | 10/2002 | Morein et al. | |
| 6,477,603 B1 | 11/2002 | Locker et al. | |
| 6,529,198 B1 | 3/2003 | Miyauchi | |
| 6,545,683 B1 | 4/2003 | Williams | |
| 6,549,963 B1 | 4/2003 | Sayles | |
| 6,557,065 B1* | 4/2003 | Peleg et al. | 710/300 |
| 6,560,659 B1 | 5/2003 | Tobias et al. | |
| 6,597,665 B1 | 7/2003 | Van Loo et al. | |
| 6,621,500 B1 | 9/2003 | Alcorn et al. | |
| 6,760,031 B1 | 7/2004 | Langendorf et al. | |
| 6,919,896 B2 | 7/2005 | Sasaki et al. | |
| 2001/0052038 A1 | 12/2001 | Fallon et al. | |
| 2002/0030694 A1 | 3/2002 | Ebihara et al. | |
| 2002/0033817 A1 | 3/2002 | Boyd et al. | |
| 2002/0122040 A1 | 9/2002 | Noyle | |
| 2002/0130870 A1 | 9/2002 | Ebihara | |
| 2003/0081391 A1 | 5/2003 | Mowery et al. | |
| 2003/0081630 A1 | 5/2003 | Mowery et al. | |
| 2003/0112248 A1 | 6/2003 | Pronkine | |
| 2003/0117441 A1 | 6/2003 | Walls et al. | |
| 2003/0128216 A1 | 7/2003 | Walls et al. | |
| 2003/0227460 A1 | 12/2003 | Schinnerer | |
| 2004/0085322 A1 | 5/2004 | Alcorn et al. | |
| 2004/0088469 A1* | 5/2004 | Levy | 710/316 |
| 2004/0181617 A1* | 9/2004 | Sauber | 710/20 |
| 2004/0223003 A1 | 11/2004 | Heirich et al. | |
| 2005/0012749 A1 | 1/2005 | Gonzalez et al. | |
| 2005/0041031 A1* | 2/2005 | Diard | 345/505 |

FOREIGN PATENT DOCUMENTS

| | | |
|---|---|---|
| EP | 1 061 434 A3 | 2/2002 |
| WO | WO 97/14133 | 4/1997 |

OTHER PUBLICATIONS

"CPU", http://www.webopedia.com/TERM/C/CPU.html.*

CompactPCI®, XP-009041090, Packet Switching Backplane Specification, Sep. 5, 2001.

International Search Report dated Apr. 6, 2005.

Kevin T. Lefebvre et al., "An API for Interfacing Interactive 3D Applications to High-Speed Graphics Hardware," May 1998, The Hewlett-Packard Journal, pp. 6-8.

Kevin T. Lefebvre et al., "An API for Interfacing Interactive 3D Applications to High-Speed Graphics Hardware," May 1998, The Hewlette-Packard Journal, pp. 6-8.

International Search Report received in related Int'l Application No. PCT/US2004/022154 dated Jan. 12, 2004.

International Search Report received in related Int'l Application No. PCT/US2007/020125 dated Sep. 22, 2008.

Intel® 82915G Graphics and Memory Controller Hub (GMCH) Jun. 2004.

Intel® 82915P Memory Controller Hub (MCH), Datasheet, Jun. 2004.

* cited by examiner

MOTHERBOARD FOR SUPPORTING MULTIPLE GRAPHICS CARDS

CROSS REFERENCE TO RELATED APPLICATIONS

Not Applicable.

SPONSORED RESEARCH OR DEVELOPMENT

Not Applicable.

SEQUENCE LISTINGS

Not Applicable.

BACKGROUND OF THE INVENTION

1. Field of the Invention

The present invention provides a computer configured to effectuate the use of multiple, off-the-shelf video cards, working in parallel.

2. Discussion of the Related Art

Constant further improvements in graphic performance in computers are needed and desired by consumers. For instance, computers are increasingly used as digital entertainment hubs in the home to perform an array of demanding content creation and data manipulation tasks, including video editing and encoding, complex image processing, HDTV decoding, multichannel audio capture and playback, and of course far more realistic 3-D gaming. Furthermore, greater Internet bandwidth capabilities through the adoption of various high-speed access technologies has resulted in the increased importance of graphics-based processing in online activities. For instance, online merchants provide increasing amounts of visual information to consumers who rely on the visual accuracy of the images in making purchasing decision. The list goes on, including applications like true voice recognition and synthesis, robust and accurate biometrics, and advanced encryption. High-end computers and workstations are also used by professionals for more computer-intensive scientific and engineering calculations, visualization and simulation, film-quality 3-D animation and rendering, advanced financial modeling, and numerous other heavy-duty chores.

Known methods for improving computer graphics performance are described below. In general, these improvements in computer graphics performance are achieved through developments in video card technology and enhancements in computer system architecture to maximize the gains in the video card performance.

Video Cards

Even before the beginning of the widespread use of personal computers, computer graphics has been one of the most promising and most challenging, aspects of computing. The first graphics personal computers developed for mass markets relied on the main computer processing unit ("CPU") to control every aspect of graphics output. Graphics boards, or video cards, in early systems acted as simple interfaces between the CPU and the display device and did not conduct any processing of their own. In other words, these early video cards simply translated low level hardware commands issued by the CPU into analog signals which the display devices transformed into on-screen images. Because all of the processing was conducted by the CPU, graphics-intensive applications had a tendency to over-utilize processing cycles and prevent the CPU from performing other duties. This led to overall sluggishness and degraded system performance.

To offload the graphics workload from the CPU, hardware developers introduced video cards equipped with a Graphic Processing Unit ("GPU"). GPUs are capable of accepting high level graphics commands and processing them internally into the video signals required by display devices. By way of an extremely simplistic example, if an application requires a triangle to be drawn on the screen, rather than requiring the CPU to instruct the video card where to draw individual pixels on the screen (i.e., low level hardware commands), the application could simply send a "draw triangle" command to the video card, along with certain parameters (such the location of the triangle's vertices), and the GPU could process such high level commands into a video signal. In this fashion, graphics processing previously performed by the CPU is now performed by the GPU. This innovation allows the CPU to handle non-graphics related duties more efficiently.

The primary drawback with early GPU-based video cards was that there was no set standard for the "language" of the various high level commands that the GPUs could interpret and then process. As a result, every application that sought to utilize the high level functions of a GPU based video card required a specialized piece of software, commonly referred to as a driver, which could understand the GPU's language. With hundreds of different GPU-based video cards on the market, application developers became bogged down in writing these specialized drivers. In fact, it was not uncommon for a particularly popular software program to include hundreds, if not thousands, of video card drivers with its executable code. This, of course, greatly slowed the development and adoption of new software. This language problem was resolved by the adoption in modern computer operating systems by standardizing methods of video card interfacing. As a result, modern operating systems, such as the Windows® based operating system (sold by Microsoft Corporation of Redmond, Wash.), require only one hardware driver to be written for a video card. An intermediate software layer called an Application Programming Interface ("API") mediates interaction between the various software applications, the CPU and the video card. As a result, all that is required is that the video drivers and the applications be able to interpret a common graphics API. The two most common graphics APIs in use in today's personal computers are DirectX®, also distributed by Microsoft Corporation, and OpenGL®, distributed by a consortium of other computer hardware and software interests.

Since the advent of the GPU-based graphics processing subsystem, most efforts to increase the throughput of personal computer graphics subsystems (i.e., make the subsystem process information faster) have been geared, quite naturally, toward producing more powerful and complex GPUs, and optimizing and increasing the capabilities of their corresponding APIs.

The graphics performance of a computer may also be improved through the use of multiple video cards, each with its own or multiple GPUs, processing graphics data in parallel. For example, co-pending and commonly assigned U.S. patent application Ser. No. 10/620,150 entitled MULTIPLE PARALLEL PROCESSOR COMPUTER GRAPHICS SYSTEM, the subject matter of which is hereby incorporated by reference in full, describes a scheme in which the display screen is divided into separate sections, and separate video cards are dedicated to the graphics processing in each of the display sections. It should be appreciated that numerous other technologies and methodologies for improving graphic performance schemes are also known, as described in the background section of U.S. patent application Ser. No. 10/620, 150.

Improvements in Computer Architecture

A computer historically comprises a CPU that communicates to various other devices via a set of parallel conductors called a bus. When first introduced, computers only had one bus and were thus called single bus systems. As depicted in FIG. 1, a bus generally includes control lines, address lines and data lines that, combined, allow the CPU to oversee the performance of various operations (e.g., read or write) by the attached devices. Specifically, the CPU uses the control lines to control the operations of the attached devices and the address lines to reference certain memory locations within the device. The data lines then provide an avenue for data transferred to or from a device.

Originally, most buses were set to run at a specified speed, measured in hertz or cycles per second. The CPU and the other various devices attached to the bus transferred data at different speeds, some faster than others. If the bus speed is unregulated, the different transfer speeds of the various components could potentially cause communications problems. Specifically, data transfer errors occur when relatively slower communicating components miss or lose messages from other components. To avoid this problem, the clock bus speed was set at a sufficiently slow speed so that all the components can communicate relatively error free through the bus.

This configuration, however, creates significant performance limitations, because data transfer rates are restricted to the levels of the slowest communicating components on the bus, thus preventing the relatively faster devices from realizing their full potential. The overall system performance could be improved by increasing the throughput (data transfer rates) for all of the devices on the bus and by similarly increasing the fixed bus speed. However, the system-wide improvement is relatively complex and expensive to implement.

To address the above-described problems, a multi-bus configuration may be used. In a multi-bus configuration, faster devices are placed on separate, higher speed buses linked directly to the processor, thus allowing these high throughput devices to work more productively. For instance, it is common to have a separate local bus for graphics processors and other high throughput devices. This configuration thereby allows the high throughput devices to communicate without hindrance from the limitations of other devices.

There are several known ways to create a faster bus. As suggested above, increasing the speed of the bus (clock speed) allows more data transfers to take within a certain time. The capacity of the bus may also be achieved by increasing the width of the bus (i.e., increasing the amount of information being transferred on the bus at a particular instant). Referring back to FIG. 1, an increase in the number of address lines would effectively increase the number of addressable memory locations. Similarly, an increased number of data lines would enable more data bits to be sent at a time.

As described above, a computer may use various buses or a combination of buses. Currently known types of buses are summarized below in TABLE 1:

TABLE 1

| Bus Type | Max Clock Speed | Max Word Length | Comments |
| --- | --- | --- | --- |
| Industrial Standard | 8 MHz | 8 or 16 bits | Requires two clock ticks for 16 bit data |

TABLE 1-continued

| Bus Type | Max Clock Speed | Max Word Length | Comments |
| --- | --- | --- | --- |
| Architecture (ISA) | | | transfer Very slow for high performance disk accesses and high performance video cards |
| Enhanced Standard Architecture (EISA) | 8.33 MHz | 32-bit | Can support lots of devices Supports older devices which have slower or smaller word lengths Transfers data every clock tick. |
| Micro channel Architecture (MCA) | 10 MHz | 32-bit | Transfers data every clock tick. |
| Video Electronics Standard Association (VESA)/ Enhanced Video Electronics Standard Association Local Bus (VL) | 33 MHZ | 32-bit | Cannot take advantage of 64-bit architecture. Restricted on the number of devices, which can be connected (1 or 2 devices). |
| Peripherals Component Interconnect (PCI) | 33 or 66 MHz | 32 or 64 bit | The PCI bus has a special chip set which allows more sophisticated control over the devices; PCI Bus can support many devices |
| Peripheral Component Interconnect Extended (PCI-X) | 66 or 133 MHz | 64 bit | Primarily in computer servers |

Currently, most personal computer systems rely on a PCI bus to connect their different hardware devices. PCI is a 64-bit bus, though it is usually implemented as a 32-bit bus. A PCI bus runs at clock speeds of 33 or 66 MHz. At 32 bits and 33 MHz, the PCI local bus standard yields a throughput rate of 133 MBps. In the case of video cards, the bandwidth of the PCI bus has become increasingly limiting.

Related to PCI, Peripheral Component Interconnect Extended (PCI-X) is a computer bus technology that increases the speed that data can move within a computer from 66 MHz to 133 MHz. Thus, PCI-X potentially doubles the speed and amount of data exchanged between the computer processor and peripherals. With PCI-X, one 64-bit bus runs at 133 MHz with the rest running at 66 MHz, allowing for a data exchange of 1.06 GB per second. PCI-X, however, is used primarily in computer servers, and not in desktop computers.

In response to the bandwidth limitations of the PCI Bus, the Accelerated Graphics Port ("AGP") bus was developed for use with graphics processing devices, and most high performance video cards currently connect to the computer exclusively through a dedicated AGP slot found on the motherboard. AGP is based on PCI but is designed especially for the throughput demands of 3-D graphics. Rather than using the PCI bus for graphics data, AGP introduces a dedicated point-to-point channel so that the graphics controller can directly access main memory. The AGP channel is 32 bits wide and runs at 66 MHz. This translates into a total bandwidth of 266 MBps, as opposed to the PCI bandwidth of 133 MBps. AGP also supports three optional faster modes, with throughputs of 533 MBps (2×), 1.07 GBps (4×), and 2.14 GBps (8×). In addition, AGP further improves graphics performance by allowing graphics-related data and 3-D textures to be stored in main memory rather than video memory.

As the major hardware subsystems get faster, at different rates and move more data around, PCI and other currently used interconnects just cannot handle the load. Also, with the increasingly powerful and complex GPUs and better optimized and capable APIs, bus bandwidth limitations are again becoming a primary limitation to graphic system performance. Furthermore, many current and emerging tasks need faster processors, graphics, networking, and storage subsystems, and that translates into a need for much faster interconnects between those subsystems. Accordingly, new types of scalable bus standards, such as PCI Express (described in greater detail below), are being developed to address these limitations while preserving compatibility with existing components.

Despite the above-described innovations and other known advances for enabling improvements in computer graphic performance, there remains a continuous need for further improvements. For commercial viability, these improvements should use commonly available, off-the-shelf components. Furthermore, the improvements should not require extensive changes in hardware or software, so that the improved computer retains general compatibility with existing components and applications.

No known, commonly available computer currently uses two or more high performance graphics cards.

BRIEF SUMMARY OF THE PRESENT INVENTION

In response to these and other needs, the current invention provides a system and method for supporting two or more high bandwidth PCI Express graphics slots on a single motherboard, each capable of supporting a commonly available, off-the-shelf video card. In one embodiment, the motherboard chipset supports at least 32 PCI Express lanes, with these lanes being routed into two ×16 PCI Express graphics slots. In another embodiment, the motherboard chipset supports at least 24 PCI Express lanes, with 16 lanes being routed into one ×16 PCI Express graphics slot, and the remaining eight lanes being routed into one ×8 PCI Express graphics slot (which slot physically could use the same connector used by the ×16 PCI Express graphics slot, but it would only have eight PCI Express lanes "active"). In yet another implementation, the present invention splits the 16 lanes dedicated to the ×16 connect, enabling two ×8 PCI Express graphics slots (which slots physically could use the same connector used by the ×16 PCI Express graphics slot, but would only have eight PCI Express lanes "active"). And finally, the present invention can use a PCI Express switch that converts the 16 lanes coming from the chipset "root complex" into two ×16 links that connect two ×16 PCI Express graphics slots. Importantly, each and every embodiment of the present invention is agnostic to a specific chipset (e.g., Intel, AMD, etc.).

BRIEF DESCRIPTION OF THE DRAWINGS

These and other advantages of the present invention are described more fully in the following drawings and accompanying text in which like reference numbers represent corresponding parts throughout.

DETAILED DESCRIPTION OF THE PREFERRED EMBODIMENTS

The present invention exploits the below-described PCI Express interconnect to provide a motherboard that supports two or more high bandwidth PCI Express graphics slots, each capable of supporting a commonly available, off-the-shelf video card.

Figure 1:
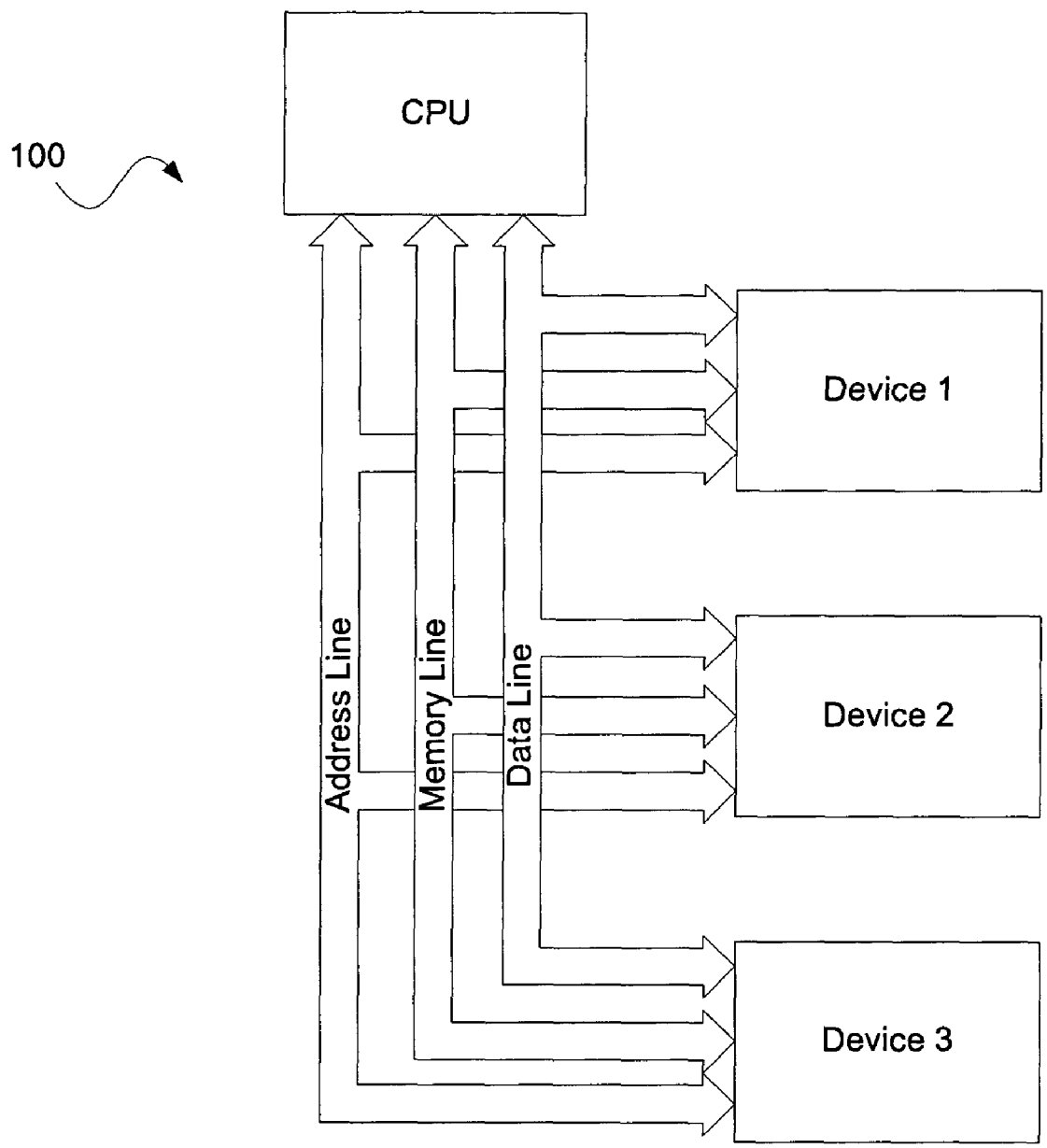
FIG. 1 is a schematic, high-level illustration of a conventional computer bus.
Figure 2A:
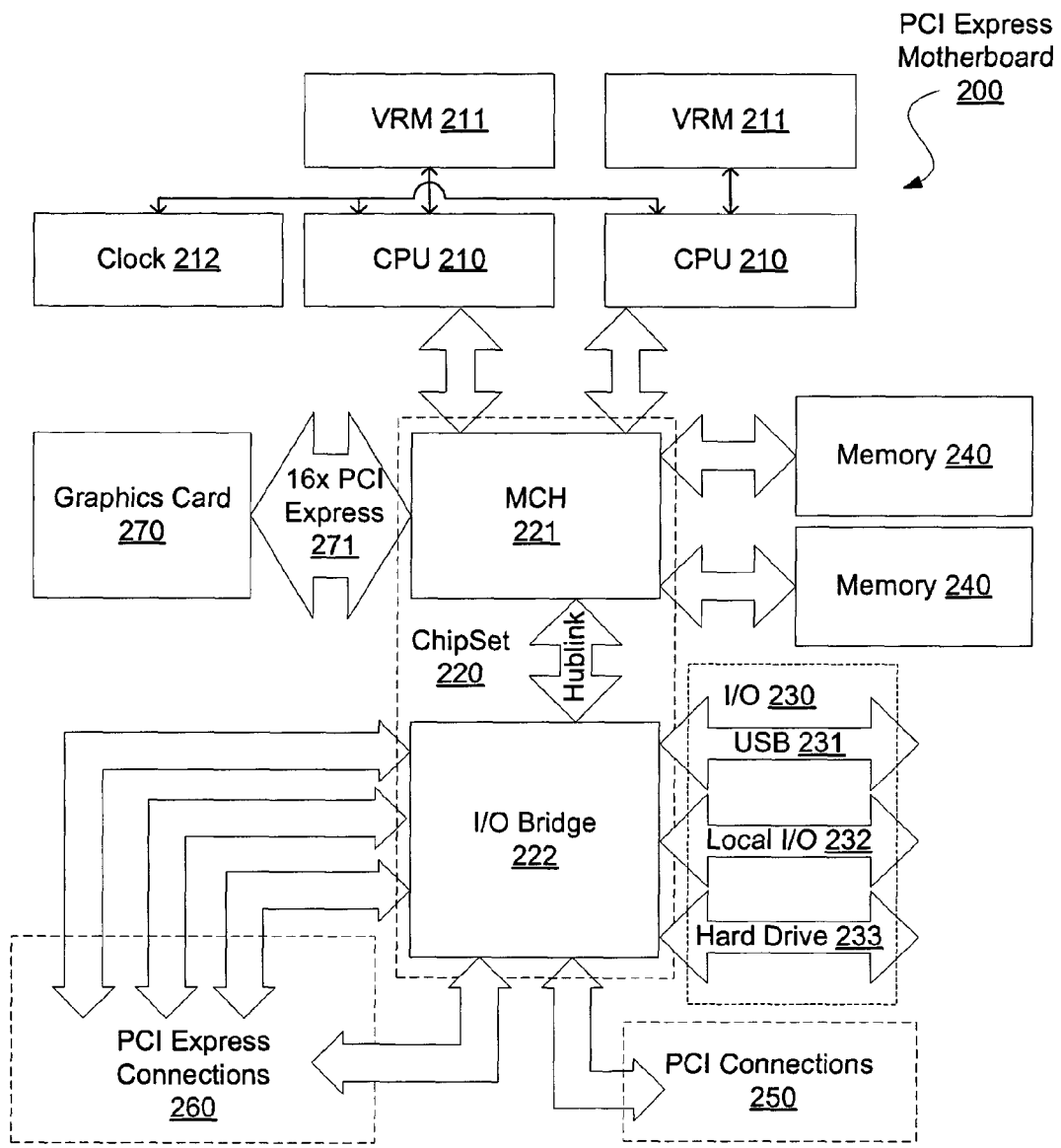
FIGS. 2A-2B are schematic illustrations of conventional PCI Express motherboards.
Figure 2B:
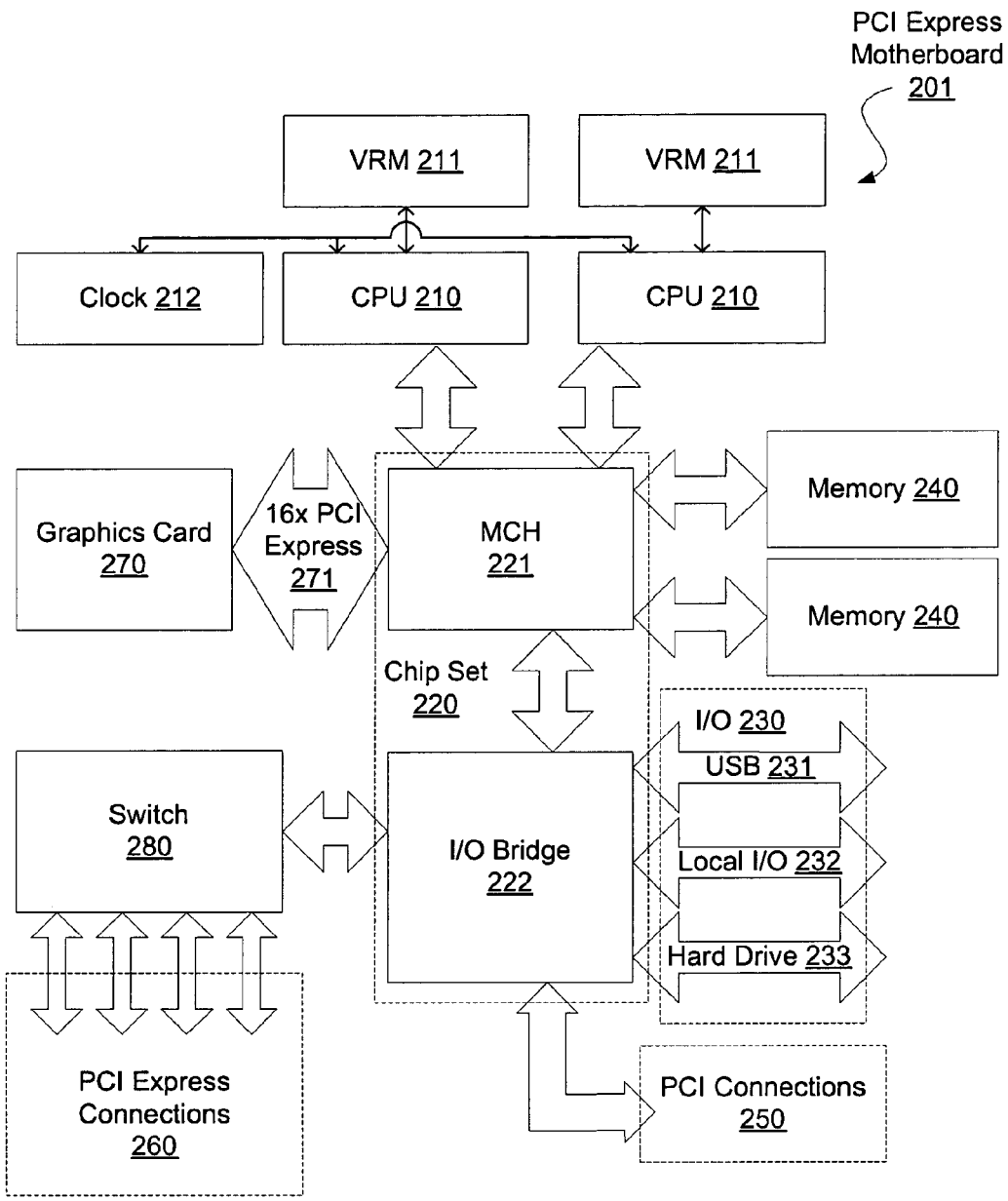

PCI Express®, as depicted in FIGS. 2A and 2B (Prior Art), is a new type of computer interconnect that will supplant the widely used PCI, PCI-X and AGP buses described above. PCI Express is a high-performance interconnect that gives more for less, meaning more bandwidth with fewer pins. PCI Express is designed to leverage the strengths of yesterday's and current general I/O architectures while addressing immediate and future I/O architectural and mechanical issues with current technologies. A few examples of these issues are bandwidth constraints, protocol limitations and high pin count. More technically speaking, PCI Express is a high speed, low voltage, differential serial pathway for two devices to communicate with each other. PCI Express uses a protocol that allows devices to communicate simultaneously by implementing dual unidirectional paths between two devices.

Compared to the shared, parallel bus architecture of PCI and past buses, point-to-point connections permit each device to have a dedicated link without arbitrating for a shared bus. PCI Express is targeted at chip-to-chip I/O interconnects, expansion card connections, and it can act as an I/O attach point on the motherboard for other interconnects such as USB 2.0, InfiniBand, Ethernet, and 1394/1394b.

A quick overview of a PCI Express-based motherboard is now provided. The following description of PCI Express is meant for illustrative purposes and is not intended to limit the present invention. The PCI Express interconnect is still under development and refinement. It is anticipated that PCI Express will evolve and change as needed, and thus, these changes should fall within the present invention. A complete understanding of PCI Express is generally outside the scope of the current application, and more information on PCI Express can be found at www.express-lane.org. For additional information on PCI Express, please also refer to Don Anderson, et al., PCI EXPRESS SYSTEM ARCHITECTURE; Adam Wilen, et al., INTRODUCTION TO PCI EXPRESS: A HARDWARE AND SOFTWARE DEVELOPER'S GUIDE; and Ed Solari And Brad Congdon, COMPLETE PCI EXPRESS REFERENCE, THE: DESIGN INSIGHTS FOR HARDWARE AND SOFTWARE DEVELOPERS. The subject matter of these three books is hereby incorporated by reference in full.

Returning now to FIGS. 2A and 2B, the motherboard 200 or 201 has one or more CPUs 210 connected to various components via a chipset 220. The CPU 210 is the brain of the computer, where most calculations take place. In modern computers, the CPU 210 is housed in a single chip called a microprocessor. Two typical components of the CPU 210 are an arithmetic logic unit ("ALU"), which performs arithmetic and logical operations and a control unit that extracts instructions from memory and decodes and executes them, calling on the ALU when necessary.

Continuing with FIGS. 2A and 2B, the CPU 210 is generally connected to a VRM 211 and a clock 212. The VRM 211, short for voltage regulator module, regulates the power supplied to the CPU 210, typically in the range 3.3V. The VRM may also carry out a dual voltage or "split rail" voltage scheme in which the CPU 210 receives an external or I/O voltage, typically 3.3V, and a lower internal or core voltage, usually 2.8V to 3.2V. The clock 212 is an oscillator, typically a quartz-crystal circuit similar to those used in radio communications equipment, that sets the tempo for the processor. Clock speed is usually measured in MHz (megahertz, or millions of pulses per second) or GHz (gigahertz, or billions of pulses per second).

A chipset 220 is a group of microchips designed to work and sold as a unit to connect the CPU 210 to the various components on the motherboard 200, 201. It should be appreciated that the various motherboards described in this application, the various combination components connected to the motherboard, and the chipset 220 may be adapted as needed to meet commercial and practical needs. Thus, the following description of the motherboard 200, 201 and the implementation of the chipset 220 is provided merely for illustration and should not be used to limit the present invention. Importantly, each and every embodiment of the present invention is agnostic to a specific chipset (e.g., Intel, AMD, etc.) or the scalable, high-speed bus employed by the chipset.

In one current implementation of a PCI Express motherboard, the chipset 220 includes a memory controller hub (MCH) 221 and an input/output (I/O) bridge 222. The MCH 221 is a host bridge that provides a high-speed, direct connection from the CPU 210 to memory 240 and a video or graphics card 270. The PCI Express connection 271 between the MCH 221 and the graphics card 270 is described in greater detail below. Similar to the MCH 221, the I/O bridge 222 regulates connections between the CPU 210 and the other components on the motherboard 200, 201. The MCH 221 and the I/O bridge 222 are relatively well-known microchips. For instance, Intel® Corp. of Santa Clara, Calif. produces an 875 chipset that that includes an 82875 MCH microchip and an 82801EB or 82801ER I/O Controller Hub (ICH) microchip. While a PCI Express chipset will differ, the PCI Express chipset may use similar components.

The various components connecting to the CPU 210 via the I/O bridge 222 are now summarized. For instance, the I/O bridge 222 may connect the CPU 210 to various I/O connections 230. These I/O connections 230 include universal serial bus (USB) 231, Local I/O 232, and disk connections 233 such as Serial Advanced Technology Attachment (SATA).

USB 231 is a plug-and-play interface between a computer and add-on external devices (such as audio players, joysticks, keyboards, telephones, scanners, printers, etc.). With USB connections 231, a new device can be added to a computer without having to add an adapter card or even having to turn the computer off.

The Local I/O connection 232, such as a low pin count (LPC) interface, connects the CPU 210 to various components on the motherboard. The LPC Interface allows the legacy I/O motherboard components, typically integrated in a Super I/O chip, to migrate from the ISA/X-bus to the LPC interface, while retaining full software compatibility. The LPC Specification offers several key advantages over ISA/X-bus, such as reduced pin count for easier, more cost-effective design. The LPC interface is software transparent for I/O functions and compatible with existing peripheral devices and applications and describes memory, I/O and DMA transactions. Unlike ISA, which runs at 8 MHz, the LPC interface uses the PCI 33 MHz clock. LPC memory consists of a flash memory with an LPC interface built in and is designed to replace standard flash for storing the BIOS on PC motherboards. Communicating over the LPC bus allows larger memory with fewer pins.

As described above, the local I/O connection 232 may include a single Super I/O chip that, much like the system chipset, performs many functions that used to take several pieces of hardware in the past. This design standardizes and simplifies the motherboard and, thus, reduces cost. The Super I/O chip typically is responsible for controlling the slower-speed, mundane peripherals found in every computer. Since these devices have been mostly standardized, they are virtually the same on every PC, and it is easier to integrate these into a commodity chip instead of worrying about them for each motherboard design. The major functions of the Super I/O controller chip are Serial Port Control, Parallel Port Control and Floppy Disk Drive Control. A Super I/O controller chip may further integrate other functions as well, such as the real-time clock, keyboard controller, and, in some cases, even the IDE hard disk controllers.

The hard drive connection 233 connects mass storage devices (e.g., hard disk or CD-ROM drive) to computer systems. As its name implies, SATA is based on serial signaling technology, unlike Integrated Drive Electronics (IDE) hard drive connections that use parallel signaling. With either SATA or IDE interfaces, a controller is integrated into the mass storage devices. Either types of interfaces may support Ultra Direct Memory Access (DMA), a protocol the enables burst mode data transfer rates of 33.3 MBps, and ATA/100, an updated version of ATA that increases data transfer rates to 100 MBps. (triple the standard of 33 MBps).

Continuing with FIGS. 2A-2B, the I/O Bridge 222 (such as the proposed Intel® 41210 Serial-to-Parallel PCI Bridge) may include a PCI Express-to-PCI bridge that enables existing PCI/PCI-X adapters and add-in cards to connect to the motherboard 200, 201 via the PCI connections 250.

The various PCI-Express adapters and add-in cards may connect to the motherboard 200, 201 through the PCI Express connections 260. The details of the PCI Express connections 260 are described in greater detail below in the following discussion of the operations of the PCI Express bus. As depicted in FIG. 2B, the PCI Express motherboard 201 may include a switch 280 that distributes data between the I/O bridge 222 and various components connected to the PCI connections 260.

Figure 5:
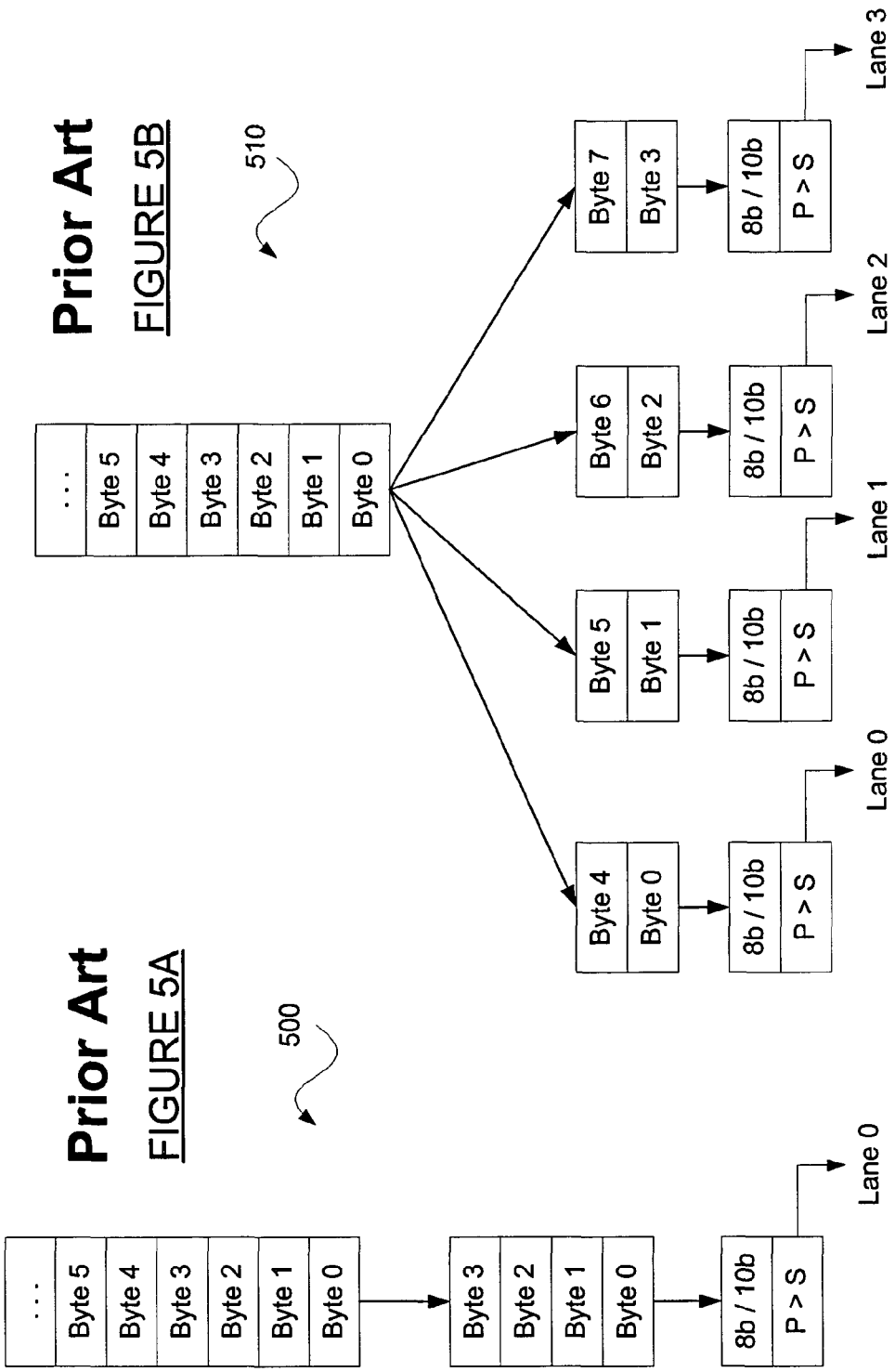

A PCI Express connection, or link, is based on lanes. A lane is a serial link capable of establishing a bi-directional communication between two hardware devices ("end points"). A single, basic PCI Express serial link (as described below in FIG. 5 and the accompanying text) is a dual-simplex connection using two low-voltage pairs of differentially driven signals—a receive pair and a transmit pair (four wires). A differential signal is derived by using the voltage difference between two conductors. The first-generation PCI Express link signaling speed is 2.5 Gbits/sec per wire pair (in each direction), and a 5 Gbit/sec link may become available by the time PCI Express ships in volume in early 2004.

A dual simplex connection permits data to be transferred in both directions simultaneously, similar to full duplex connections (as in telephones), but with dual simplex, each wire pair has its own ground unlike full duplex, which uses a common ground. Higher speed and better signal quality is attainable with dual simplex connections. With the PCI bus, for instance, an initiating device must first request access to the shared PCI bus from a central arbiter, and then take control of the bus to transfer data to a target device, with data transfers occurring in one direction between two devices at any given point in time.

Another key feature of the basic PCI Express serial link is its embedded clocking technique using 8b/10b encoding. The clock information is encoded directly into the data stream, rather than having the clock as a separate signal. As described below, the 8b/10b encoding essentially requires 10 bits per 8 bit character, or about 20% channel overhead.

The PCI Express connections 260, 271 may be comprised of multiple lanes. Each lane is comprised of the two differentially driven pair of wires (transmit and receive) of a basic link, as mentioned earlier. The lanes may scale 2.5 Gbit/sec in each direction to 10 Gbits/sec and beyond in the future. Multiple lanes can be connected between devices, chips, etc. While operating similarly to parallel interfaces, each of the lanes is actually a pair of grouped independent serial connections, thus avoiding the signal quality problems cited earlier for parallel interfaces.

A PCI Express link can have single lane (×1) or multiple lanes can be combined (e.g., ×2, ×4, ×8, ×12, ×16, and ×32 lane widths). For example, combining two lanes produces a ×2 link (read "by" 2), combining four lanes produces a ×4 link, and so forth (×8, ×16, ×32). For most applications, a ×1 link (ie., single lane) will suffice. Given a ×1 link has 4 wires (two differential signal pairs, one in each direction), a ×16 link would have sixteen differential signal pairs in each direction, or sixty-four wires for bi-directional data. At the high end, a ×32 link can transmit 10 GB/sec each direction (2.5 Gbits/sec×32/8 bits). But with 8b/10b encoding, the transmission rate is actually in the range of 8 GB/sec because of the 20% embedded clock overhead.

The links in PCI Express are symmetric and cannot be configured asymmetrically, with more lanes in one direction versus the other. Furthermore, lane ordering can be swapped per device, and polarities of the positive and negative conductors of a differential signal pair can be inverted at the receiver to provide design flexibility and help avoid physical signal crossovers in layout.

As mentioned above, PCI Express uses a packetized and layered protocol structure, and it does not require any sideband signaling riding alongside the main serial interconnection as sometimes used in AGP. Layered protocols have been used for years in data communications and permit isolation between different functional areas in the protocol, and allow updating/upgrading different layers often without requiring changes in the other layers. For example, new transaction types might be included in newer revisions of a protocol specification that does not affect lower layers, or the physical media might be changed with no major effects on higher layers.

Graphics cards will generally need more than a ×1 link. In fact, due to the high amount of data that needs to be transferred to a graphics card, it has been established that all currently planned PCI Express motherboards will have a single ×16 PCI Express slot dedicated solely to support a graphics card. Thus, if a specific chipset supports twenty PCI Express lanes, sixteen lanes would be dedicated to the ×16 graphics slot, and the remaining four lanes would be used for four ×1 slots. All currently planned PCI Express motherboards only support a single ×16 PCI Express graphics slot.

Figure 3A:
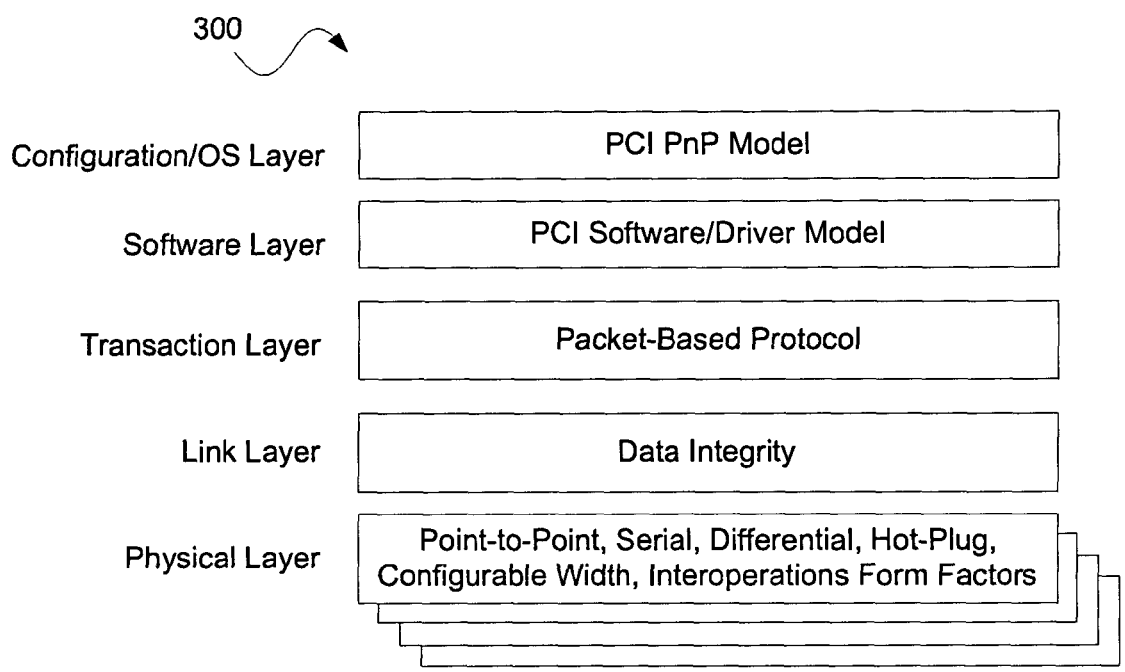
FIGS. 3A-3B, 4 and 5A-5B are schematic illustrations of the operations of PCI Express motherboards.

The PCI Express architecture is based on layers, as depicted in the PCI Express layer diagram 300 in FIG. 3A. Compatibility with the current PCI addressing model, a load-store architecture with a flat address pact is maintained unchanged. PCI Express configuration also generally uses standard mechanisms as defined in the PCI Plug-and-Play specification. The software layers in the PCI Express layer diagram 300 generates read and write requests that are transported by the transaction layer to the I/O devices using a packet-based, split-transaction protocol. The link layer adds sequence numbers and cyclic redundancy code (CRC) to these packets to create a highly reliable data transfer mechanism. CRC is in checking for errors in data transmissions on a communications link. A sending device applies a 16- or 32-bit polynomial to a block of data that is to be transmitted and appends the resulting CRC to the block. The receiving end applies the same polynomial to the data and compares its result with the result appended by the sender. If they agree, the data has been received successfully. If not, the sender can be notified to resend the block of data. Continuing with the PCI Express layer diagram 300, the basic physical layer (described in greater detail below) consists of a dual-simplex channel that is implemented as a transmit pair and a receive pair.

Figure 3B:
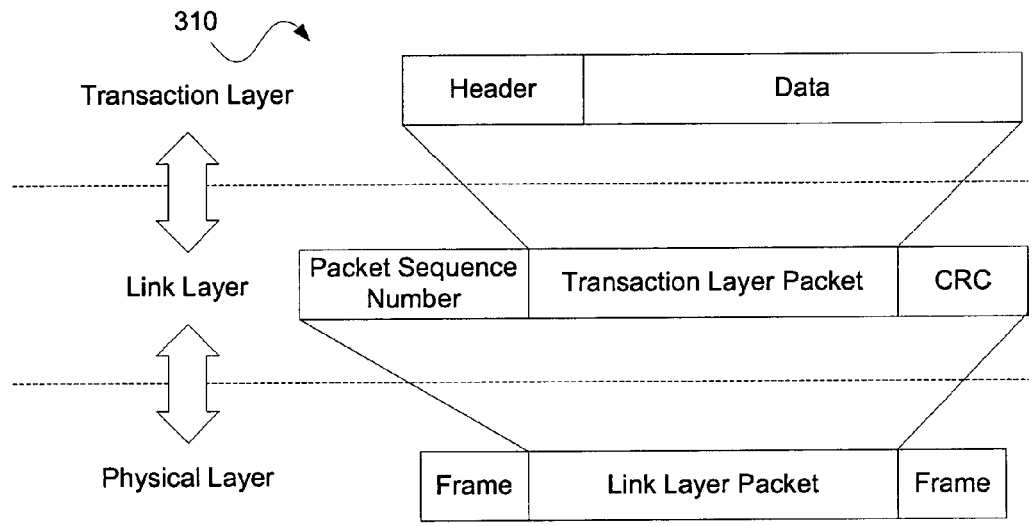

Referring now to FIG. 3B, a PCI Express data layer diagram 310 illustrates the relationship of the data between the different layers. As suggested above, the primary role of the link layer is to ensure reliable delivery of the packet across the PCI Express link. The link layer is responsible for data integrity and adds a sequence number and the CRC to the transaction layer packet, as shown in FIG. 3B. Most packets are initiated at the Transaction Layer using a credit-based, flow control protocol that ensures that packets are only transmitted when it is known that a buffer is available to receive this packet at the other end. This configuration eliminates any packet retries, and their associated waste of bus bandwidth due to resource constraints. The Link Layer then automatically resends a packet that was signaled as corrupted.

Continuing with the PCI Express data layer diagram 310 of FIG. 3B, the transaction layer receives read and write requests from the software layer and creates request packets for transmission to the link layer. All requests are implemented as split transactions, and some of the request packets will need a response packet. The transaction layer also receives response packets from the link layer and matches these with the original software requests. Each packet has a unique identifier that enables response packets to be directed to the correct originator. The packet format supports 32-bit memory addressing and extended 64-bit memory addressing. Packets also have attributes such as "no-snoop", "relaxed-ordering" and "priority" which may be used to optimally route these packets through the I/O subsystem.

The transaction layer in PCI Express is designed to support four address spaces, including three PCI address spaces (memory, I/O and configuration) and a Message Space. PCI 2.2 introduced an alternate method of propagating system interrupts called Message Signaled Interrupt (MSI). In MSI, a special-format memory write transaction was used instead of a hard-wired sideband signal. The PCI Express specification also uses the MSI concept as a primary method for interrupt processing and uses Message Space to support all prior side-band signals, such as interrupts, power-management requests, resets, and so on, as in-band messages. Other special cycles within the PCI 2.2 specification, such as Interrupt Acknowledge, are also implemented as in-band messages. The PCI Express Messages function as virtual wires since they effectively eliminate the wide array of sideband signals currently used in a platform implementation.

Figure 4:
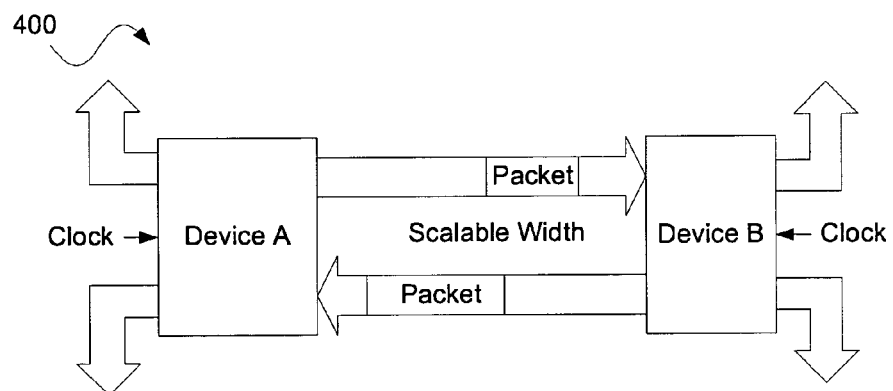

Referring now to FIG. 4, a fundamental PCI Express ×1 link 200 consists of two, low-voltage, differentially driven pairs of signals, a transmit pair and a receive pair. A data clock is embedded using the 8b/10b encoding scheme to achieve very high data rates, initially 0.25 Giga transfers/second/ direction. Thus, the physical layer actually transports packets between the link layers of two PCI Express agents.

The transportation of byte data is depicted in a ×1 lane byte data diagram 500 of FIG. 5A. Specifically, different packets of data are sent serially (ie., one after the other) across the single lane. Each byte is transmitted across the lane with 8b/10b encoding, as described above.

As previously described, the bandwidth of a PCI Express link may be linearly scaled by adding signal pairs to form multiple lanes. The physical layer supports ×1, ×2, ×4, ×8, ×12, ×16 and ×32 line (or greater) widths. With multiple lanes byte data diagram 510 of FIG. 5B. The multiple lanes byte data diagram 510 demonstrates the splitting of byte data for transport using ×4 (four lane) connection. Specifically, the data is disassembled for parallel transport across the four lanes and then reassembled at the receiving end. This data disassembly and re-assembly is transparent to other layers.

During initialization, each PCI Express link is set up following a negotiation of lane widths and frequency of operation by the two agents at each end of the link. No firmware or operating system software is involved. The PCI Express architecture comprehends future performance enhancements via speed upgrades and advanced encoding techniques. The future speeds, encoding techniques or media would only impact the physical layer.

PCI Express Motherboard for Multiple Graphics Cards

By exploiting the above-described PCI Express interconnect, the present invention provides a motherboard that supports two or more high bandwidth PCI Express graphics slots, each capable of supporting a commonly available, off-the-shelf video card. Specifically, the current invention provides a system and method for supporting two or more high bandwidth (e., 2×8 or higher bandwidth connections) PCI Express Graphics slots on a single motherboard. The integration of the two or more high bandwidth graphics cards may be accomplished in several ways.

Figure 6:
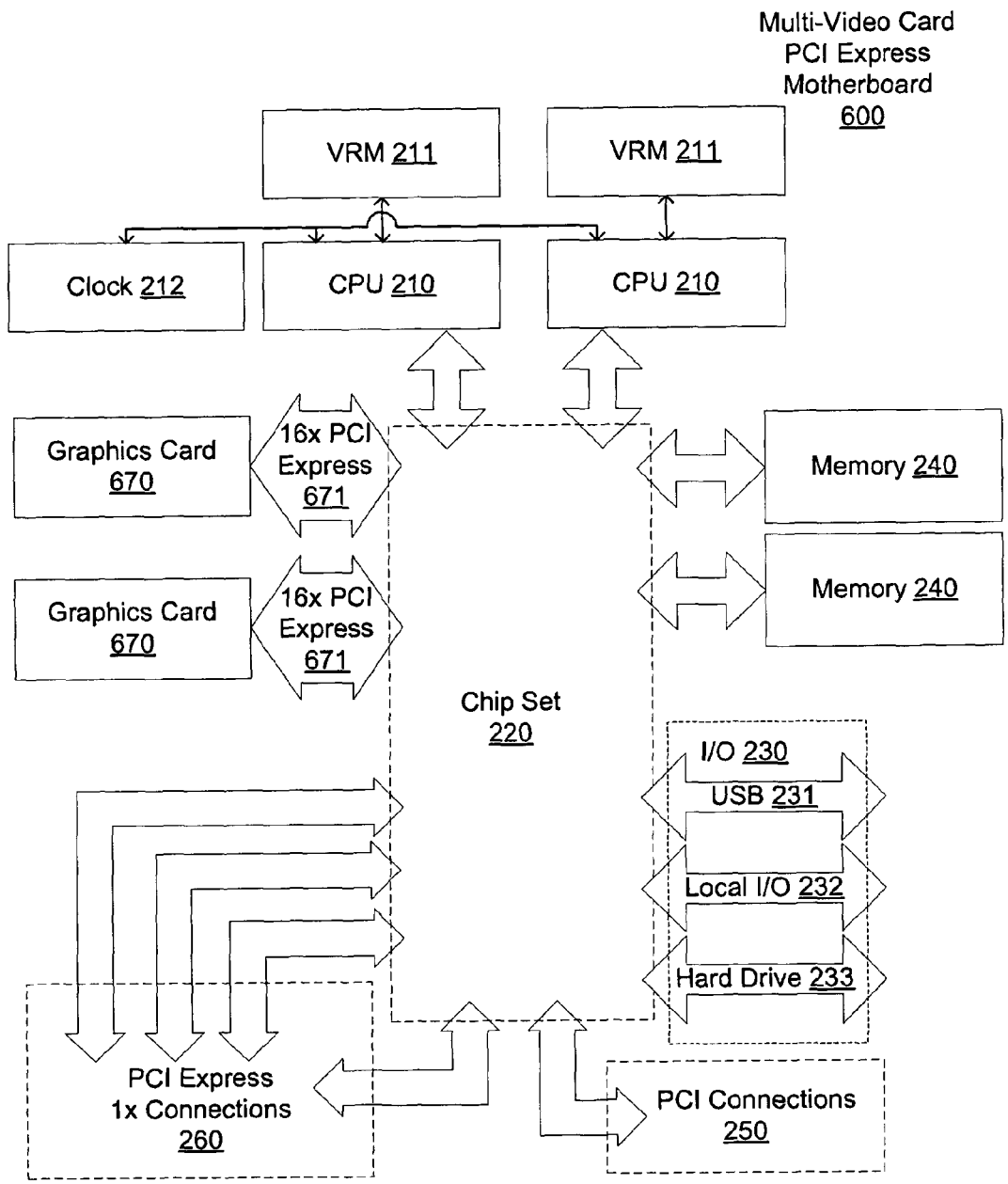
FIGS. 6-10 depict schematic illustrations of a PCI Express motherboard containing multiple video cards in accordance with the various embodiments of the present invention.

Turning to FIG. 6, one embodiment of the present invention provides Multi-Video Card PCI Express Motherboard 600 that supports at least thirty-two PCI Express lanes, where these lanes are routed into two or more ×16 PCI Express Graphics slots. Specifically, the Multi-Video Card PCI Express Motherboard 600 connects two or more graphics card 670 to the MCH 221, each connected via a 16×PCI Express connection 671. The performance of the multiple video cards may be synchronized using various known techniques. For instance, the above-referenced U.S. patent application Ser. No. 10/620,150 provides a scheme for coordinating the operations of multiple GPUs. In the present invention, the various GPUs are located on separate graphics cards, each connected to a high bandwidth PCI Express graphics slot.

Figure 7:
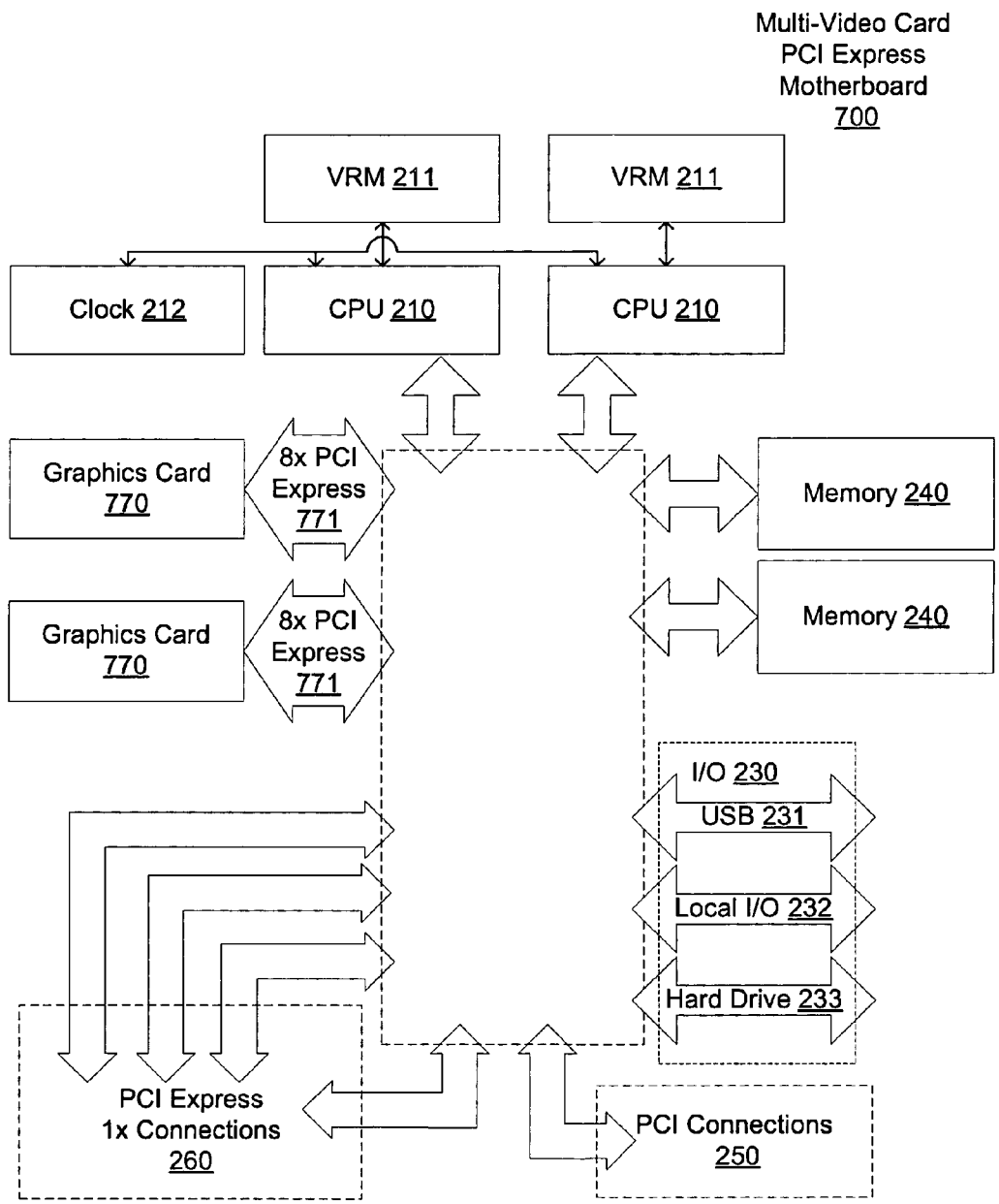

In another implementation of the present invention depicted in FIG. 7, a Multi-Video Card PCI Express Motherboard 700 divides the sixteen lanes dedicated to the ×16 connect to form a pair of ×8 connections 771 for connecting the graphics cards 770 to the MCH 221. Specifically, the Multi-Video Card PCI Express Motherboard 700 may have two ×8 graphics slots. In the same way, a ×32 connection (or the pair of ×16 connections depicted in FIG. 6) may be divided to form four ×8 connections. While each of the ×8 slots has a reduced bandwidth capacity in comparison to ×16 slot, the capacity of the ×8 still exceeds the current capabilities of many video cards. Furthermore, the performance of a pair of video cards 770 connected to the ×8 slots will generally exceed the performance of a single video card connected to a ×16 slot.

Figure 8:
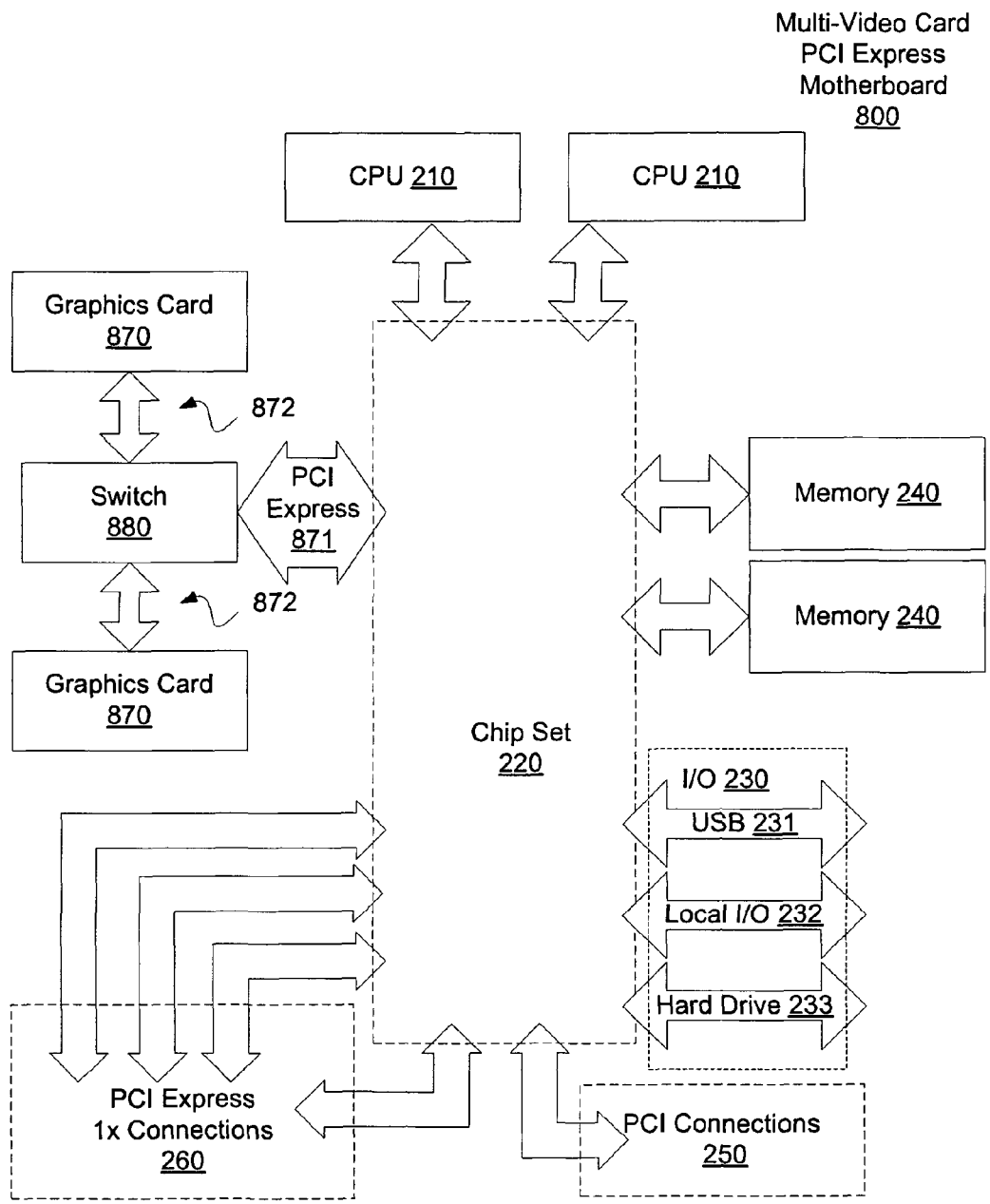

Referring now to FIG. 8, another embodiment of the present invention provides a Multi-Video Card PCI Express Motherboard 800 that connects two or more video cards 870 using a PCI Express switch 880. The PCI Express switch 880 converts the sixteen lanes 871 coming from the chipset 220 root complex into two or more distributed ×16 links 872, each connected to a ×16 PCI Express Graphics slot. When connected by the switch 880 to the chipset 220, a video card 870 may send a very large burst of data via the PCI Express connection 871 and the distributed ×16 link 872. Because the video card 870 does not continuously export data at the capacity of the PCI Express connection 871, the use of the switch 880 better allows the Multi-Video Card PCI Express Motherboard 800 to exploit the large capacity of the ×16 connection to the chipset 220.

Figure 9:
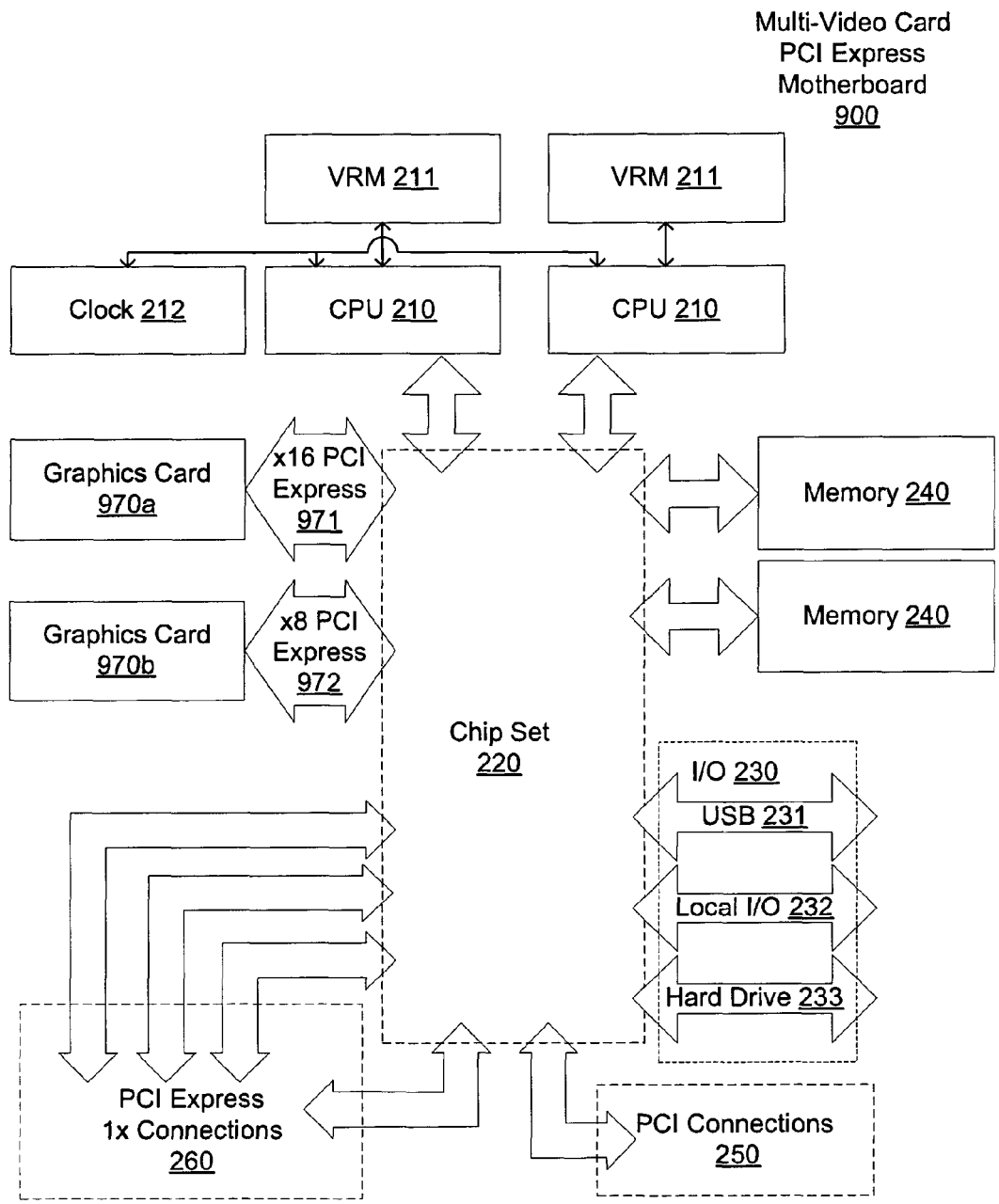

In another implementation of the present invention depicted in FIG. 9, a Multi-Video Card PCI Express Motherboard 900 divides twenty-four lanes from the chipset 220 to form a ×16 connection 971 and a ×8 connection 972 to the graphics cards 970a and 970b, respectively. The graphics card slot associated with the ×8 connection 972 is generally physically identical to the graphics card slot associated with the ×16 connection 971. However, the ×8 connection 972 provides approximately half the bandwidth. Thus, the graphics cards 970a and 970b may be substantially similarly and are generally interchangeable so long as the graphics cards 970a and 970b detect the nature of the PCI Express connection (i.e., whether the connection is ×8 or ×16) and operate accordingly.

Figure 10:
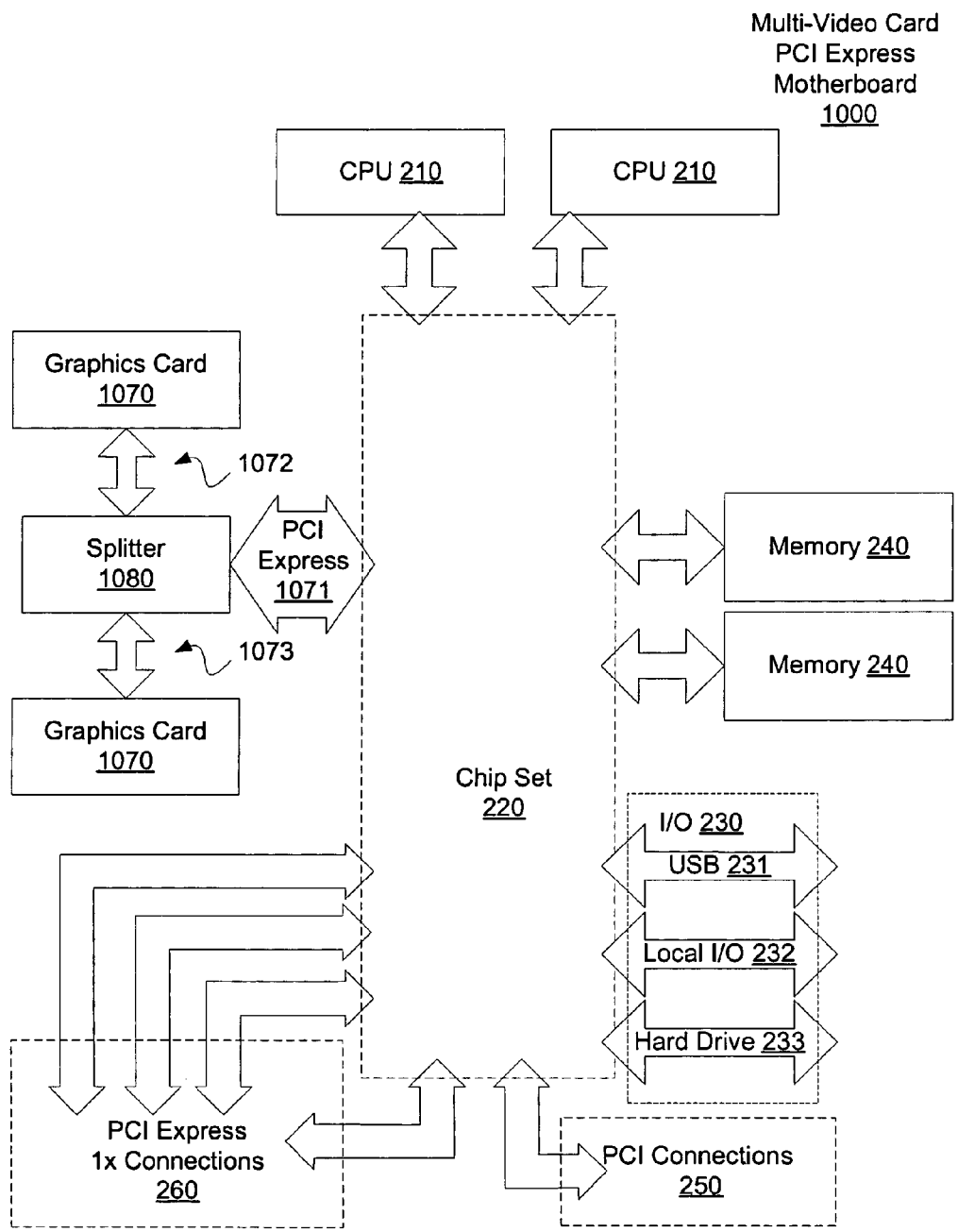

The various embodiments of the present invention may also be implemented using a Multi-Video Card PCI Express Motherboard 1000, as depicted in FIG. 10. In particular, the Multi-Video Card PCI Express Motherboard 1000 uses a splitter 1080 which routes data transfer from a PCI Express connection 1071 to multiple graphics cards 1070 via connections 1072 and 1073. In contrast to the switch 880 which allocates access to the chipset 220, the splitter 1080 merely physically divides lanes in the PCI Express connection 1071. For instance, a ×16 connection may be divided into two ×8 connections, a ×24 connection may be divided into ×8 and ×16 connections, a ×32 connection may be divided into two ×16 connections, and so on.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. In particular, it is foreseeable that different components using different data transfer standards may be added to a PCI Express motherboard. Furthermore, the present invention, while primarily be adapted to provide any number of video card slots using the techniques described herein. The teachings of the present invention may also be combined to form various combinations of high-speed video slots. For instance, one of the 8×PCI Express connection 771 may be connected to a switch 880 to distribute the bandwidth of that 8×PCI Express connection 771 to two or more ×8 video cards slots. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A motherboard, comprising:
   a chipset for managing data transfers within the motherboard;
   a scalable interconnect connecting to the motherboard, said scalable interconnect supporting a number of interconnect lanes; and
   a plurality of high-speed video card slots connected to the interconnect, the high speed video card slots including at least one first video card slot and second video card slot; and
   a switch connected to said interconnect and adapted to convert the interconnect lanes into a plurality of distributed links such that there is a different one of said distributed links providing a connection to each of said plurality of high-speed video card slots,
   wherein the motherboard enables a first and a second video card to attach, respectively, to the at least one first video card slot and second video card slot, and wherein the motherboard enables the first and the second video cards to operate in parallel to output graphics data to a single visual display device, and wherein said switch is configured to distribute lanes dynamically during operation including data transmission to said plurality of high-speed video card slots responsive to changes in bandwidth needs during processing by said video cards.

2. The motherboard of claim 1, wherein said interconnect comprises a ×16 connection and said first and second high-speed video card slots are each physically configured as ×16 video card slots, and wherein said switch dynamically distributes bandwidth from said ×16 connection to said two ×16 video card slots via said distributed links.

3. The motherboard of claim 1, wherein said interconnect comprises at least a ×32 connection.

4. The motherboard of claim 3, wherein said interconnect is divided into two or more ×16 connections between the chipset and the plurality of high-speed video card slots.

5. The motherboard of claim 1, wherein said interconnect comprises at least a ×16 connection, and wherein said interconnect is divided into a ×8 connection between the chipset and each of said plurality of high-speed video card slots.

6. The motherboard of claim 1, wherein said interconnect comprises a connection having at least 24 lanes, and wherein said switch dynamically distributes lanes at any given time during operation into a ×8 connection between the chipset and one of said plurality of high-speed video card slots and a ×16 connection between the chipset and another of said plurality of high-speed video card slots.

7. The motherboard of claim 1, wherein the switch allocates a first ×16 connection to the first video card slot and a second smaller-scaled connection to the second video card slot.

8. The motherboard of claim 7, wherein the second connection is at least one of a ×1, ×2, ×4, and ×8 connection.

9. The motherboard of claim 1, further comprising a peripheral slot connected to the interconnect, wherein the first video card slot and the second video card slot have first prespecified dimensions and the peripheral slot has second prespecified dimensions, wherein the second dimensions differs from the first dimensions.

10. The motherboard of claim 1, wherein the first video card slot and the second video card slot have first prespecified dimensions and wherein the first dimensions of the video card slots are selected to allow a graphics card to be coupled to any of the video card slots.

11. The motherboard of claim 10, wherein the graphics card is designed to be used with a ×16 connection.

12. The motherboard of claim 1, wherein a display area of the display device is divided into first and second sections, said first video card performing graphics processing related to said first section; and said second video card performing graphics processing related to said second section.

13. A motherboard for supporting multiple video cards, the motherboard, comprising:
   a processor socket adapted to receive a central processing unit (CPU);
   a single scalable interconnect that provides data paths to the processor socket, said scalable interconnect supporting a number of interconnect lanes;
   a plurality of high-speed video card slots connected to the interconnect, wherein each of the video card slots has first prespecified dimensions and is specifically adapted for coupling to a video card; and
   a switch connected to said interconnect and adapted to convert the interconnect lanes into a plurality of distributed links such that there is a different one of said distributed links providing a connection to each of said plurality of high-speed video card slots,
   wherein the motherboard is capable of receiving substantially similar first and second video cards and facilitating parallel operation of the first and second video cards to output graphics data to a single visual display device, and wherein said switch is configured to distribute lanes dynamically during operation including data transmission to said plurality of high-speed video card slots responsive to changes in bandwidth needs during processing by said video cards.

14. The motherboard of claim 13, wherein each of the video card slots is configured to couple with a graphics card designed to be used with a ×16 connection.

15. The motherboard of claim 13, wherein the interconnect and said switch produce a first data path and a second data path, each of the first and second data paths connecting the processor socket to different video card slots, the first data path being equal to or larger in scale than the second data path.

16. The motherboard of claim 15, wherein the second data path comprises at least one of a ×1, ×2, ×4, and ×8 connection.

17. The motherboard of claim 13, further comprising a peripheral slot connected to the interconnect, the peripheral slot having different dimensions from the video card slots.

18. The motherboard of claim 13, wherein a display area of the display device is divided into first and second sections, said first video card performing graphics processing related to said first section; and said second video card performing graphics processing related to said second section.

19. The motherboard of claim 13, wherein said interconnect comprises a ×16 connection and said high-speed video card slots are physically configured as ×16 video card slots, and wherein said switch dynamically distributes bandwidth from said ×16 connection to two ×16 video card slots via said distributed links.

20. The motherboard of claim 13, wherein said interconnect comprises a connection having at least 24 lanes, and wherein said switch dynamically distributes lanes at any given time during operation into a ×8 connection between the chipset and one of said plurality of high-speed video card slots and ×16 connection between the chipset and another of said plurality of high-speed video card slots.

21. A high performance computer, comprising:
   a motherboard including a CPU and scalable interconnect that supports a number of interconnect lanes, wherein the scalable interconnect connects to a first and a second high-speed video card slots via a switch, the first and second high-speed video card slots having a substantially similar physical configuration, and wherein the video slot physical configuration is selected to allow the first and the second high-speed video card slots each to accept a graphics card;

a first graphics card coupled to the first high-speed video card slot; and a second graphics card coupled to the second high-speed video card slot, wherein the following occurs during operation including data transmission of said computer said first and second graphics cards operate in parallel to output graphics data to a display device, said switch converts said interconnect lanes into two distributed links such that there is a different one of said distributed links connecting to each of said plurality of high-speed video card slots, and said switch distributes lanes to said distributed links in response to current bandwidth needs of said graphics cards during processing by said cards.

22. The computer of claim 21, wherein a display area of the display device is divided into first and second sections, said first video card performing graphics processing related to said first section; and said second video card performing graphics processing related to said second section. slots and a ×16 connection between the chipset and another of said plurality of high-speed video card slots.

23. The computer of claim 21, wherein said interconnect comprises a ×16 connection and said high-speed video card slots are physically configured as ×16 video card slots, and wherein said switch dynamically distributes bandwidth from said ×16 connection to said two ×16 video card slots via said distributed links.

24. The computer of claim 21, wherein said interconnect comprises a connection having at least 24 lanes, and wherein said switch dynamically distributes lanes at any given time during operation into a ×8 connection between the chipset and one of said plurality of high-speed video card slots and a ×16 connection between the chipset and another of said plurality of high-speed video card slots.

* * * * *